United States Patent [19]

Asaumi et al.

[11] Patent Number: 4,839,221

[45] Date of Patent: Jun. 13, 1989

[54] GASKET CONTAINING (I) A SHEET COMPOSITION COMPRISING (A) PTFE (B) INORGANIC POWDER (C) CLAY MINERAL AND (II) A METAL SUPPORT FOR THE SHEET

[75] Inventors: Hiroshi Asaumi, Kamakura; Zenji Shimura, Odawara; Takehiro Yoshida, Tokyo; Kenji Tadakuma, Chigasaki; Shinzaburo Suzuki, Yokohama; Norio Takada, Tokyo; Kenichi Nakamura, Yokohama; Takene Hirai, Tokyo, all of Japan

[73] Assignee: Nichias Corporation, Tokyo, Japan

[21] Appl. No.: 106,254

[22] Filed: Oct. 9, 1987

[30] Foreign Application Priority Data

| Jan. 9, 1987 | [JP] | Japan | 62-1841 |
| Mar. 12, 1987 | [JP] | Japan | 62-57613 |
| Apr. 3, 1987 | [JP] | Japan | 62-81244 |
| Apr. 3, 1987 | [JP] | Japan | 62-81243 |
| Jun. 26, 1987 | [JP] | Japan | 62-157847 |

[51] Int. Cl.$^4$ ............................ F16J 15/12; C08K 3/34
[52] U.S. Cl. ............................ 428/283; 428/325; 428/422; 428/465; 524/430; 524/447; 524/456; 524/546
[58] Field of Search ............... 428/422, 283, 325, 463; 524/430, 447, 458, 546

[56] References Cited

U.S. PATENT DOCUMENTS

| 4,042,747 | 8/1977 | Breton et al. | 428/323 |
| 4,335,180 | 6/1982 | Traut | 428/303 |
| 4,518,737 | 5/1985 | Traut | 524/413 |
| 4,563,488 | 1/1986 | Minami et al. | 523/222 |
| 4,620,995 | 11/1986 | Otomo et al. | 427/420 |

*Primary Examiner*—Herbert J. Lilling
*Attorney, Agent, or Firm*—Oblon, Spivak, McClelland, Maier & Neustadt

[57] ABSTRACT

Use of a composition comprising a polytetrafluoroethylene resin and a fine inorganic powder for a gasket, said composition being characterized in that the polytetrafluoroethylene resin is at least 5% by weight and the fine inorganic powder is at least 40% by weight, based on the total amount of the polytetrafluoroethylene resin and the fine inorganic powder; the total amount of the polytetrafluoroethylene resin and the fine inorganic powder is at least 80% by weight based on the entire amount of the composition; and the polytetrafluoroethylene resin and the fine inorganic powder are mutually uniformly dispersed and mixed with each other.

5 Claims, 7 Drawing Sheets

GASKET CONTAINING (I) A SHEET COMPOSITION COMPRISING (A) PTFE (B) INORGANIC POWDER (C) CLAY MINERAL AND (II) A METAL SUPPORT FOR THE SHEET

The present invention relates to use of a specific composition comprising a polytetrafluoroethylene resin and a fine inorganic powder for a gasket. More particularly, it relates to use of such a composition for a gasket which is excellent in the heat resistance and the chemical resistance as well as in the sealing properties and the stress relaxation properties.

Heretofore, as a gasket material to be used for valves, pumps, piping connectors, various machines and equipments, a gasket material composed mainly of asbestos has been most commonly known. However, in recent years, use of asbestos has been restricted for the reason that asbestos creates a problem of environmental pollution. As a gasket material not using asbestos, a rubber sheet, a vermiculite sheet using rubber as a binder, an expanded graphite sheet, or a glass cloth or carbon cloth impregnated with a polytetrafluoroethylene resin dispersion, is known.

However, such gasket materials not using asbestos have the following problems. Namely, the rubber sheet is poor in the heat resistance and can hardly be useful at high temperatures. The vermiculite sheet using rubber as a binder tends to lead to sticking due to the thermal degradation of the rubber, and its sealing properties are poor. The expanded graphite sheet has low strength and thus is poor in the handling efficiency, and it is expensive. The glass cloth or carbon cloth impregnated with a polytetrafluoroethylene resin dispersion has a problem with respect to the stress relaxation properties, and its sealing properties are poor. Besides, it is expensive.

Further, as a gasket to be used under a high temperature and high pressure condition such as a cylinder head gasket for an automobile engine, a composite gasket is known which comprises a support e.g. a rugged metal plate such as a jagged steel plate or an embossed aluminum plate and an asbestos sheet as mentioned above or other gasket material integrally bonded on each side of the support. However, such a composite gasket has the same problems as mentioned above. Further, as a soft sheet gasket to be used under a low seating stress, an asbestos sheet using rubber as a binder or the one using the above-mentioned various gasket materials is known. However, such a soft sheet gasket also has various problems to be solved.

The object of the present invention is to solve the above-mentioned problems and to provide a gasket having excellent heat resistance and sealing properties and being free from the problem of environmental pollution and inexpensive, and which thus can be substituted for the asbestos sheet and which further has excellent oil resistance, water resistance and stress relaxation properties.

The present inventors have found that a specific composition comprising a polytetrafluoroethylene resin and a fine inorganic powder as defined hereinafter, is excellent for use as a gasket material, and the above object can readily and advantageously be thereby accomplished.

The present invention provides use of a composition comprising a polytetrafluoroethylene resin and a fine inorganic powder for a gasket, said composition being characterized in that the polytetrafluoroethylene resin is at least 5% by weight and the fine inorganic powder is at least 40% by weight, based on the total amount of the polytetrafluoroethylene resin and the fine inorganic powder; the total amount of the polytetrafluoroethylene resin and the fine inorganic powder is at least 80% by weight based on the entire amount of the composition; and the polytetrafluoroethylene resin and the fine inorganic powder are mutually uniformly dispersed and mixed with each other.

Now, the present invention will be described in detail with reference to the preferred embodiments.

In the present invention, the polytetrafluoroethylene resin (hereinafter referred to simply as PTFE) includes, in addition to a homopolymer of tetrafluoroethylene, a copolymer of tetrafluoroethylene with a small amount (for example, not higher than 0.5 mol%) of a comonomer not to impart melt flowability to the resin. As such a comonomer, hexafluoropropylene, a perfluoro(alkyl vinyl ether), a perfluoro(alkoxyalkyl vinyl ether), trifluoroethylene or a perfluoroalkylethylene may be mentioned. If the molecular weight is too low, the resin tends to be liquid or gel, such being undesirable. Therefore, the PTFE preferably contains at least 50% of a solid having a molecular weight of at least $10^3$ as calculated from the standard specific gravity. A PTFE obtained by emulsion polymerization is preferred in view of the compatibility with the fine inorganic powder or in view of the efficiency for fibrillation wich will be described hereinafter. However, a fine powder of PTFE obtained by other polymerization method may be incorporated to the PTFE obtained by emulsion polymerization.

The PTFE is preferably at least partially fibrillated by a shearing force. The presence of such a fibrillated PTFE improves the dispersion of the PTFE or the fine inorganic powder in the composition and thus improves the moldability of the composition or the flexibility of a molded product when the composition is molded into a sheet.

In the present invention, as the inorganic fine powder, it is preferred to employ a fine inorganic powder having an average particle size of not larger than about 100 μm and having excellent heat resistance and chemical resistance. If the average particle size is too large, the gasket tends to lose the surface smoothness, the sealing properties tend to be poor or the moldability is likely to deteriorate, such being undesirable. As such an fine inorganic powder, various types may be employed. However, a water-containing silicate mineral composed mainly of silicon and aluminium and containing magnesium, iron, an alkaline earth metal and/or an alkali metal, is preferably employed in view of the efficiency for molding or excellent sealing properties and stress relaxation rate of the sheet gasket. Particularly preferred is a kaoline-type clay mineral such as kaolinite, halloysite or hydrated halloysite.

In the use of the composition for a gasket according to the present invention, the PTFE is at least 5% by weight and the fine inorganic powder is at least 40% by weight, based on the total amount of the PTFE and the fine inorganic powder. If the amount of the PTFE is less than 5% by weight, it is difficult to obtain a gasket which is dense and has excellent sealing properties, the recovery from the compression of the gasket tends to be small, it is difficult to obtain a gasket material having a low porosity and the obtained gasket material is hardly useful for a gasket. It is particularly preferred that the PTFE is at least 10% by weight. There is no particular restriction as to the upper limit for the amount of the PTFE. However, if the amount is too much, the product will be expensive, and the merit as a gasket material for general purpose will be reduced, and the compressibility of the gasket material tends to decrease. For these reasons, the amount is preferably not higher than 60% by weight, more preferably not higher than 50% by weight.

If the amount of the fine inorganic powder is less than 40% by weight, the stress relaxation rate tends to increase, and the proportion of the expensive PTFE increases. Accordingly the gasket will be expensive, which is not suitable for general use. As the amount of the fine inorganic powder increases, the stress relaxation rate decreases, but it becomes difficult to obtain a gasket material which is dense and has a low porosity and a small pore size. Namely, the sealing properties tend to be poor. A preferred content of the fine inorganic powder is from 50 to 90% by weight.

The composition useful for a gasket according to the present invention may contain, in addition to the above described PTFE and fine inorganic powder, a filler such as an inorganic fiber powder or a synthetic resin. As such an inorganic fiber powder, the one having excellent heat resistance and chemical resistance may be employed, such as a carbon fiber powder, a glass fiber powder or an alumina fiber powder. As the synthetic resin, a resin having excellent heat resistance such as a perfluoroalkoxy resin, a perfluoroethylenepropylene resin or a phenol resin may be mentioned. By the incorporation of such an inorganic fiber powder, the compressibility of the gasket increases, which is desirable. Such an inorganic fiber powder preferably has a diameter of from 3 to 30 μm, more preferably from 6 to 15 μm and a length of from 50 to 300 μm, more preferably from 70 to 200 μm. By the incorporation of the synthetic resin, the retention of the fine inorganic powder will be improved, and the sealing properties will also be improved. When the filler such as the inorganic fiber powder and/or the synthetic resin is incorporated, the total amount of the PTFE and the fine inorganic powder should be not less than 80% by weight based on the entire amount of the composition for a gasket. If the total amount of the PTFE and the fine inorganic powder is too small, it becomes difficult to obtain a proper stress relaxation rate for a gasket, and the gasket tends to be hardly durable for use for a long period of time. Further, the amount of the inorganic fiber powder is preferably not more than 10% by weight based on the entire amount of the composition. If the amount of the inorganic fiber powder is excessive, the molding of a gasket tends to be difficult. The amount of the synthetic resin is preferably not more than 10% by weight based on the entire amount of the composition. If the amount of the synthetic resin is excessive, the recovery from the compression tends to be small, such being undesirable.

In the use of the composition for a gasket according to the present invention, the PTFE and the fine inorganic powder are required to be mutually uniformly dispersed and mixed with each other in the composition. It is usually preferred that the PTFE is fibrillated and the inorganic fine powder is dispersed in the fibrillated PTFE. With the PTFE being fibrillated, the fine inorganic powder is firmly retained, whereby the molding is facilitated and the strength of the gasket is improved.

The fibrillation of the PTFE can readily be accomplished by applying a mechanical shearing force prior to or after the mixing with the fine inorganic powder or during the molding. For example, the PTFE containing or not containing the fine inorganic powder may be fibrillated by high speed stirring in the presence or absence of an assisting agent such as naphtha.

In the present invention, as the fine inorganic powder, various types of powders may be employed as mentioned above. However, particularly preferred is a fine inorganic powder containing at least 30% by weight of a clay mineral, based on the entire amount of the fine inorganic powder. Such a clay mineral is composed essentially of a ferrosilicate. Particularly preferred is a clay mineral composed essentially of kaolinite, which is commonly called a clay, since it is excellent in the dispersibility in the composition of the present invention and has excellent heat resistance and chemical resistance, and it improves the moldability of the composition and provides mechanical properties desirable for a molded product as a gasket. If the amount of the clay mineral is too small, the moldability tends to be poor, and it becomes difficult to impart a sufficient flexibility to the molded sheet. The amount of the clay mineral is more preferably at least 50% by weight, most preferably at least 80% by weight, based on the entire amount of the fine inorganic powder. The clay mineral preferably has an average particle size of from 0.01 to 300 μm, more preferably from 0.01 to 100 μm. If the average particle size is too large, the surface smoothness of the molded product of the composition will be impaired, and there will be additional problems such that the sealing properties as a gasket material tend to be poor. On the other hand, if the average particle size is too small, the flexibility of the molded product of the composition tends to be poor and the creep resistance and the sealing properties tend to be poor. However, even when the average particle size of the clay mineral is small, it is possible to bring the creep resistance and the sealing properties to a satisfactory level by combining it with a fine inorganic powder or other filler having a relatively large particle size.

In the use of the composition for a gasket according to the present invention, a sheet gasket may be prepared in accordance with the following method. With or without an addition of an assisting agent such as naphtha, a mixture comprising the fine PTFE powder, the fine inorganic powder and optionally the inorganic fiber powder and/or the synthetic resin powder in the predetermined proportions, is stirred and mixed under a high shearing force by a method such as high speed stirring by a mixer, to fibrillate the PTFE, and then formed into a sheet having a predetermined shape by e.g. calendering, followed by sintering at a temperature of at least the sinterable temperature of the PTFE to obtain a sheet gasket. The fibrillation of the PTFE may be further promoted by conducting extrusion by an extruder having a large ratio of the cross-sectional surface area of the cylinder to the cross-sectional surface area of the nozzle, subsequent to the above-mentioned stirring and mixing under a high shearing force. Further, it is possible to obtain a sheet gasket having excellent surface smoothness and improved sealing properties with high density by conducting calendering or rolling after the sheet molding by calendering or after sintering the PTFE. The sheet gasket according to the present invention preferably has a compressibility of not higher than 30% as measured by the method described in the Examples given hereinafter and a recovery of at least 10%, whereby the stress relaxation will be small and the useful life will be prolonged.

In the specification of the present application, the porosity is a value calculated by the following equation from an average pore volume (cm$^3$/g) as measured by Porosimeter 2000 manufactured by Carlo Erba Company at 23° C. under a relative humidity of 25% by changing the pressure from atmospheric pressure to 2,000 atm and a substance volume (the volume of the substance per unit weight) (cm$^3$/g) as measured by ASTM D-792:

$$\text{Porosity (\%)} = \frac{\text{Pore volume}}{\text{Substance volume}} \times 100$$

The pore size is an average value of pore radii obtained by the equation $Pr = 2\sigma \cos \theta$ where P is the absolute pressure (kg/cm$^2$), r is a pore radius (nm), $\sigma$ is the surface tension of mercury (480 mN/m$^2$) and $\theta$ is a contact angle (wet angle) (141.3°), when the pressure is changed from atmospheric pressure to 2,000 atm in the measurement at 23° C. under a relative humidity of 25% by Porosimeter 2000 manufactured by Carlo Erba Company.

In the present invention, it is important that the porosity of the sheet gasket is not higher than 20%. If the porosity exceeds 20%, the stress relaxation rate increases and the useful life of the gasket tends to be shortened, and the sealing properties tend to be poor. There is no particular restriction as to the lower limit for the porosity. The smaller the porosity, the better the sealing properties. However, it is practically very difficult to produce a sheet gasket having a porosity of 0%, and the porosity will be usually at least about 1%.

In the present invention, the pore size of the sheet gasket is not larger than 1.15 μm. Even when the porosity is small, if pores having large sizes exist, the sealing properties will be poor, such being undesirable. Further, if pores having large sizes exist, the porosity tends to be high. The smaller the pore size, the better. Most preferably, the pore size is 0 from the viewpoint of the sealing properties. However, it is practically difficult to produce a gasket having a pore size of 0 i.e. having no pore. Usually, there exist pores having a pore size of about 0.009 μm. The pore size is particularly preferably within a range of from 0.01 to 0.08 μm.

There are many methods for the production of sheet gaskets having a low porosity and a small pore size. Relatively easy two methods will be described as typical examples. The first one is a method in which a synthetic resin or liquid substance is impregnated or incorporated. The second one is a method wherein a molded sheet product is pressed again. In the former method, a synthetic resin such as a thermoplastic resin is incorporated prior to the molding into a sheet product, and heating at a temperature of at least the melting point of the synthetic resin is applied during or after the molding into a sheet product so that the synthetic resin is filled into pores to reduce the porosity and the pore size. Otherwise, it is also possible to reduce the porosity and the pore size by impregnating a liquid substance such as an oil or a synthetic resin melt into a molded sheet product. However, according to this method, the synthetic resin is present on the surface and in the interior of the sheet gasket, and when the sheet gasket is used at a high temperature, sticking or fusing is likely to take place. Therefore, such a method is not suitable as a method for producing a sheet gasket to be used at a high temperature. On the other hand, according to the latter method, pressing is conducted after the molding of a sheet product or after the sintering of the molded product. Such pressing may be conducted by means of a press or rolls. The pressing by means of rolls is preferably employed since it is thereby possible to conduct the pressing operation continuously, and thus it is superior in the operation efficiency to the pressing by means of a press. The pressing pressure is usually preferably equal to or higher than the pressure used for molding the sheet product. This pressure is suitably selected depending upon the condition of the sheet product or the desired physical properties of the gasket. However, if the pressing is conducted at an excessively high pressure, no substantial further improvement is expected. The pressing pressure is preferably not higher than about 1,000 kgf/cm$^2$, and usually from 200 to 700 kgf/cm$^2$. It is preferred to conduct heating at the same time as the pressing. By the heating, the plasticity of the PTFE increases, whereby the porosity and the pore size can readily be reduced even when the pressing pressure is not so high. If the pressing temperature is too low, no adequate effect can be obtained. On the other hand, if the temperature is too high, the PTFE is likely to undergo thermal decomposition, such being undesirable. Therefore, the pressing temperature is preferably from 250° to 400° C., more preferably from 300° to 380° C.

In the use of the composition for a gasket according to the present invention, it is preferred that the PTFE is fibrillated, and the fine inorganic powder is dispersed in the fibrillated PTFE. If the PTFE is not fibrillated or the fine inorganic powder is not dispersed in the fibrillated PTFE, the sheet gasket tends to be brittle.

In the present invention, the fibrillated PTFE has a microscopically three dimensional network structure and the inorganic fine powder is uniformly dispersed in the three dimensional network structure, whereby the fine inorganic powder is firmly held by the PTFE fibrils to provide a sufficient strength for the gasket material.

The sheet gasket of the present invention having such a structure exhibits the excellent water repellency and oil repellency inherent to the PTFE throughout the entire gasket even with a small content of the PTFE, since the PTFE is uniformly present throughout the entire gasket. Namely, the gasket material will be excellent in the water and oil resistance. As mentioned above, the PTFE can readily be fibrillated by application of a high shearing force. The uniform dispersion of the fine inorganic powder in the fibrillated PTFE can readily be accomplished, for instance, by a method wherein the PTFE is fibrillated after an addition of the fine inorganic powder to a non-fibrillated PTFE, or at the same time as the mixing or after the uniform mixing. For example, such uniform dispersion can be accomplished by stirring and mixing a mixture comprising predetermined proportions of a powder of the PTFE and the fine inorganic powder under a high shearing force in the presence or absence of an assisting agent such as naphtha, for instance, by high speed stirring by means of a mixer. The PTFE may be fibrillated to a higher degree by applying a still higher shearing force, for instance, by extruding the mixture by an extruder having a high ratio of the cross-sectional surface area of the cylinder to the cross-sectional surface area of the nozzle.

In the present invention, the sheet gasket may be produced by molding the above-mentioned composition comprising the fibrillated PTFE and the fine inorganic powder dispersed therein, by a conventional sheet molding method such as press molding or roll molding by means of a press or rolls. From the efficiency of the production, the roll molding method is preferably employed, whereby continuous molding is possible.

In the use of the composition for a gasket according to the present invention, the PTFE may be sintered or non-sintered. When the PTFE is non-sintered, the sheet gasket will have a relatively large compressibility and will be well fitted with the sealing surface even at a low seating stress, to provide excellent sealing properties. Namely, it is particularly useful for application to an object such as a glass piping where a high seating stress can not be applied. When the PTFE is sintered, the sheet gasket has excellent strength and is thus particularly useful for application to an object where a relatively high seating stress is applied. The sintering of the PTFE is preferably conducted after the molding of a sheet product. If the PTFE is sintered prior to the sheet molding, it will be difficult to conduct the sheet molding. Further, if the PTFE is sintered prior to the fibrillation, it will be difficult to conduct the fibrillation of the PTFE.

In the present invention, the sheet gasket may be used by itself or in the form of a composite gasket wherein it is laminated with a metal plate. The composite gasket may be prepared by integrating the gasket material of the present invention with a support e.g. a rugged metal plate such as a jagged plate or an embossed aluminum plate, a meshed metal plate or a metal net by a suitable method such as bonding or press bonding. For example, a composite gasket having a metal core may be prepared by press bonding the sheet gasket on each side of a metal net by means of a twin roll made of iron. Likewise, a metal-coated composite gasket may be prepared by press bonding a jagged steel plate on each side of the sheet gasket.

In the present invention, a composite gasket comprising a support such as a rugged metal plate, a meshed metal plate or a metal net and a gasket material having the above described specific composition bonded integrally to the support, is particularly preferred as a gasket useful under a high temperature and high pressure condition. Such a composite gasket is particularly useful as a gasket for an engine head for an automobile. As compared with the conventional asbestos-lined sheet, the above-mentioned composite gasket of the present invention has a superior thickness precision, uniform density and excellent oil resistance, fuel oil resistance and water resistance and is free from seizing to the flange surface whereby no treatment for the prevention of seizing is required. Further, as compared with the rubber material, it is superior in the heat resistance with less thermal degradation, less weight reduction on heating and free from aging. Further, it exhibits excellent physical properties which can not be obtained by the conventional gaskets, such that there is no flow phenomenon as the sealing properties, the change of the stress relaxation is small and grommets may be omitted since there is no ventilation in the support. Since it is composed of a composition prepared by incorporating a relatively high proportion of the fine inorganic powder to the PTFE, the heat resistance can be substantially improved, and at the same time, the cost can be substantially reduced.

Now, the present invention will be described with reference to the accompanying drawings.

Figure 1:
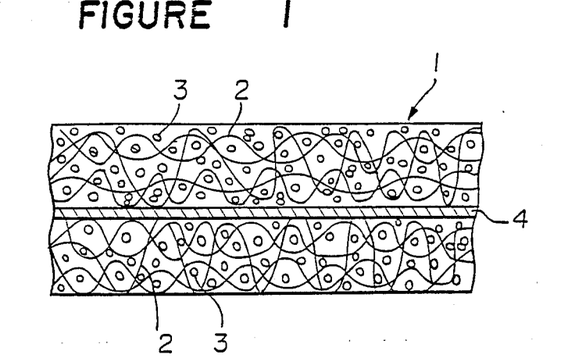
FIG. 1 is a cross-sectional view illustrating the construction of Example 1 of the present invention.

FIG. 1 illustrates Example 1 of the present invention.

Firstly, the process for the production will be described. (1) To form 10 to 40 parts by weight of a soft and highly fibrillated PTFE fine powder 2 (CD-1, manufactured by Asahi Fluoropolymer), from 60 to 90 parts by weight of a soft fine powdery inorganic filler 3 (kaolinite clay Catalpo, manufactured by Tsuchiya Kaoline Kogyo K.K.) and 250 parts by weight of 1,1,1-trichloroethane as a low viscosity organic solvent were added, and the mixture was stirred by a mixer for 20 minutes and then subjected to filtration. The filtration product was dried at room temperature. (2) To the dried product, 17 parts by weight of a high viscosity organic solvent (Isoper M, manufactured by Exon Co. Ltd.) was added, and the mixture was stirred by a kneader for 10 minutes and then aged for about 15 hours. (3) The aged product was injected into a mold having an extruding portion of a conical shape with an angle of 40° and a cross-sectional size of the extruding portion of 105 mm and having a ratio of the cross-sectional surface area of the cylinder to the cross-sectional surface area of the nozzle being 15 and extruded at room temperature under a pressure of 40 kgf/cm$^2$ at an extrusion rate of 120 mm/hr to form a rod product. (4) The rod product was inserted into a twin roller made of iron having an outer diameter of 200 mm and a length of 400 mm at a compression ratio of 36 at a rate of 1,800 mm/hr to obtain an elongated sheet having a width of 300 mm and a thickness of 0.5 mm. (5) The elongated sheet was dried with hot air at 300° C. (6) The dried sheet was baked at 350° C. for 20 minutes to sinter the PTFE. (7) The sintered sheet was press bonded to each side of a 40 mesh stainless steel net 4 (manufactured by Tsurumi Kanaami) by a twin roller made of iron, under a surface pressure of 450 kgf/cm$^2$ to obtain a gasket sheet 1 having the bonded layer thickness of 1.0 mm.

According to the above process, the PTFE fine powder and the soft fine powdery inorganic filler are uniformly mixed by the mixing operation, and a low degree of fibrillation is imparted to the PTFE fine powder as the PTFE fine powder is soft. Thus, the flowing out of the organic solvent at the time of the aging and the extrusion can be maintained at a high level, whereby excellent extrudability is obtained. In the extruded product, the PTFE fine powder is highly fibrillated with a substantial anisotropy due to the special mold structure, and accordingly even when the extruded product is subjected to calendering in the extrusion direction, the resulting molded product still have a considerable anisotropy. Therefore, a continuous production can be conducted with the process steps of extrusion→calendering→sintering→press bonding of a meshed metal plate, whereby a high productivity will be obtained. Further, with the sheet gasket obtained by sintering the above-mentioned molded product, the soft fine powdery inorganic filler is firmly held in the intertwined network structure of the PTFE filbrils due to the strong intermolecular bonding force inherent to the PTFE and due to the fact that the PTFE fine powder is finely fibrillated and intertwined. As a result, the strength, flexibility and chemical resistance of the gasket material are improved, whereby it is possible to obtain a gasket having excellent sealing properties, pressure resistance and chemical resistance. Further, by filling the soft fine powdery inorganic filler to a high degree, the heat resistance of the gasket can be increased accordingly, whereby prevention of seizing and reduction of the cost for the gasket can be accomplished simultaneously.

Figure 2:
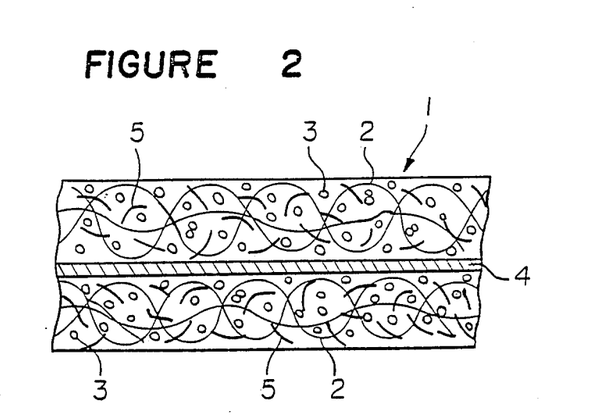
FIG. 2 is a cross-sectional view illustrating the construction of Example 2.

FIG. 2 illustrates Example 2 of the present invention.

Firstly, the process will be described. (1) To 20 parts by weight of a soft and highly fibrillated PTFE fine powder 2 (CD-1, manufactured by Asahi Fluoropolymer), 80 parts by weight of a soft fine powder inorganic filler 3 (kaolinite clay Catalpo, manfactured by Tsuchiya Kaolin Kogyo), 5 parts by weight of a soft fine powdery inorganic fiber filler 5 (an alumina fiber Fine Flex, manufactured by Nichias) and 250 parts by weight of 1,1,1-trichloroethane as a low viscosity organic solvent were added, and the mixture was stirred by a mixer for 20 minutes and subjected to filtration. The filtration product was dried at room temperature. (2) To the dried product, 20 parts by weight of a high viscosity organic solvent (Isoper M, manufactured by Exon Co., Ltd.) was added, and the mixture was stirred by a kneader for 10 minutes and then aged for about 15 hours. (3) The aged product was injected into a mold having an extruding portion of a conical shape with an angle of 40° and a cross-sectional size of the extruding portion of 105 mm and having a ratio of the cross-sectional surface area of the cylinder to the cross-sectional surface area of the nozzle being 15 and extruded at room temperature under a pressure of 50 kgf/cm² at an extrusion rate of 120 mm/hr to obtain a rod product. (4) The rod product was inserted into a twin roller made of iron having an outer diameter of 200 mm and a length of 400 mm at a compression ratio of 18 at a rate of 1,800 mm/hr to obtain an elongated sheet having a width of 300 mm and a thickness of 1 mm. (5) The elongated sheet was dried with hot air at 300° C. (6) The dried sheet was baked at 350° C. for 3 hours to sinter the PTFE. (7) The sintered sheet was press bonded to each side of a 40 mesh stainless steel net 4 (manufactured by Tsurumi Kanaami) by a twin roller made of iron under a surface pressure of 500 kgf/cm² to obtain a gasket sheet 1 having a bonding layer thickness of 1.0 mm.

According to the above process, the soft fine powder inorganic fiber filler is added to the soft fine powdery inorganic filler, whereby the compressibility of the gasket material can be increased by the intertwining of the fibers, and in addition to the effects obtained by the preceding Example, the fitting properties of the gasket will be improved. As a result, it is possible to ensure the sealing under a low seating stress.

The PTFE has a structure wherein F atoms completely fill the circumference of the carbon chain since the C–F bonding distance is small, and accordingly the surface is smooth and highly dense. Further, the agglomeration energy between the PTFE molecules is very small, whereby the PTFE is likely to undergo slippage in the crystals or between crystals due to the compression shearing force (so called cold flow), which is amplified due to the specific crystal structure i.e. the molecular chains of the PTFE are straight-chained without no substantial intertwining since the repulsion of the F atoms to one another is substantial.

Thus, the PTFE is likely to undergo slippage due to a compression shearing force even at a low temperature, and this tendency is further amplified at a high temperature. The fine inorganic powder serves as an agent for preventing such a tendency, and the distinct effect in this respect is observed when the fine inorganic powder is at least 40% by weight.

The gasket material of the present invention containing a high proportion of the fine inorganic powder at a level of at least 40% by weight has a particularly excellent heat resistance, and as shown below in Table 1, it provides adequate properties as a gasket material as compared with the asbestos gasket material.

TABLE 1

| Examples | | Example 1 | | | Example 2 | Conventional product |
|---|---|---|---|---|---|---|
| Composition (parts by weight) | | | | | | |
| PTFE | | 40 | 20 | 10 | 20 | Asbestos gasket |
| Kaolinite clay | | 60 | 80 | 90 | 80 | |
| Alumina fiber | | | | | 5 | 1.0 |
| Density (resin) (g/cm³) | | 2.2 | 2.2 | 2.2 | 2.2 | 1.8 |
| Compressibility (%) (350 kgf/cm²) | ASTMF 36 | 4 | 5 | 6 | 7 | 13 |
| Recovery (%) (350 kgf/cm²) | ASTMF 36 | 56 | 54 | 50 | 48 | 45 |
| Stress relaxation rate (%) (100° C. × 24 hr) | ASTMF 38 | 15 | 11 | 8 | 8 | 50 |
| Oil resistance (%) (weight increase) | ASTMF 104 | 2 | 3 | 3 | 3 | 16 |
| Water resistance (%) (weight increase) | ASTMF 104 | 1 | 2 | 2 | 2 | 35 |
| Sealing properties (antifreezer) Leaking pressure under a seating stress of 50 kgf/cm² (test piece : 90φ × 70φ) | kgf/cm² | 5 | 3 | 3 | 4 | 2 |

Figure 3:
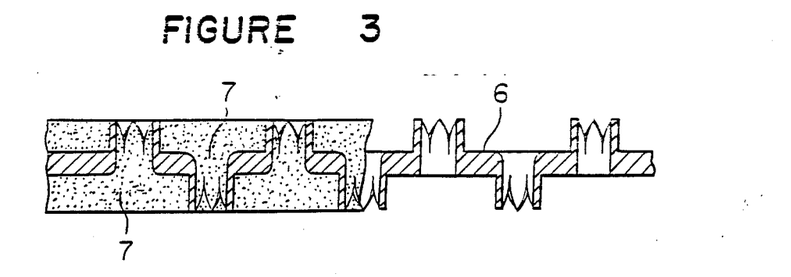
FIG. 3 is a cross-sectional view illustrating the construction of Example 3.
Figure 4:
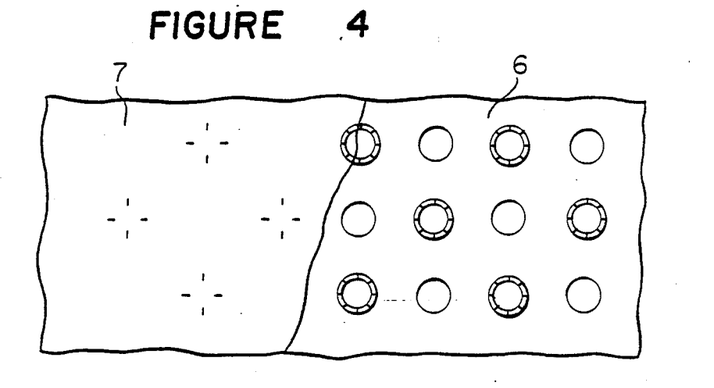
FIG. 4 is a plan view of the construction of Example 3 which is partially broken.
Figure 5:
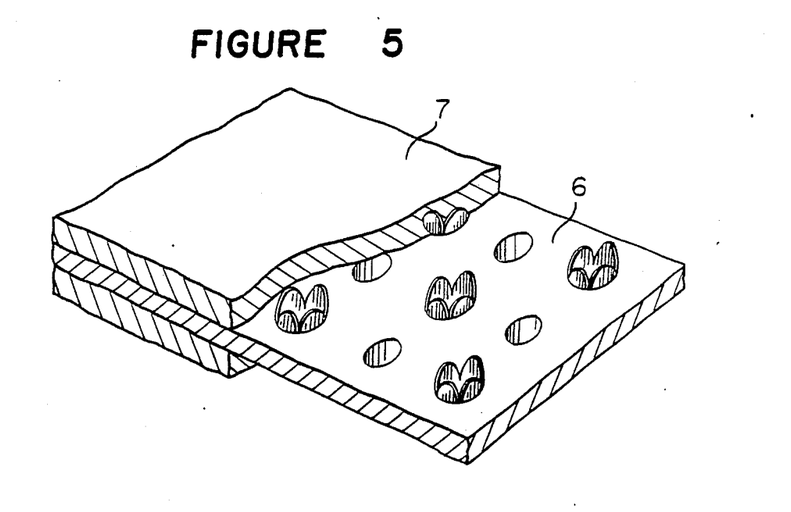
FIG. 5 is a perspective view of the construction of Example 3 which is partially broken.

FIGS. 3 to 5 illustrate Example 3 of the present invention. These Figures show a composite gasket wherein a jagged steel plate 6 is used as a rugged metal plate, and a gasket material 7 prepared by incorporating the fine inorganic powder to the PTFE is bonded to each side of the jagged steel plate 6.

Now, the process for its preparation will be described. (1) In the same manner as in the preceding Examples, to 20 parts by weight of a soft and highly fibrillated PTFE fine powder (CD-1, manufactured by Asahi Fluoropolymer), 80 parts by weight of a soft fine powder inorganic filler (kaolinite clay Catalpo, manufactured by Tsuchiya Kaolin Kogyo) and 250 parts by weight of 1,1,1-trichloroethane as a low viscosity organic solvent were added, and the mixture was stirred by a mixer for 20 minutes and then subjected to filtration. The filtration product was dried at room temperature. (2) To the dried product, 17 parts by weight of a high viscosity organic solvent (Isoper M, manufactured by Exon Co., Ltd.) was added, and the mixture was stirred by a kneader for 10 minutes and then aged about 15 hours. (3) The aged product was injected into a mold having an extruding portion of a conical shape with an angle of 40° and a cross-sectional size of the extruding portion of 105 mm and having a ratio of the cross-sectional surface area of the cylinder to the cross-sectional surface area of the nozzle being 15 and extruded at room temperature under a pressure of 40 kgf/cm$^2$ at an extrusion rate of 120 mm/hr to obtain a rod product. (4) The rod product was inserted into a twin roller made of iron having an outer diameter of 200 mm and a length of 400 mm at a compression ratio of 36 at a rate of 1,800 mm/hr to obtain an elongated sheet having a width of 300 mm and a thickness of 0.6 mm. (5) The elongated sheet was dried with hot air at 300° C. (6) The dried product was baked at 350° C. for 3 hours to sinter the PTFE. (7) By means of a twin roller made of iron, the gasket material 7 i.e. the sintered sheet was press bonded under a surface pressure of 450 kgf/cm$^2$ to each side of a jagged steel plate 6 made of SPCC with a thickness of 0.25 mm and provided with perforated hooks with a diameter of perforations being 1.2 mm, to obtain a composite gasket having a thickness of 1.2 mm and a density of the resin portion of 2.2 g/cm$^3$. The various properties of the above-mentioned gasket material 7 are as shown in the column for "product of the present invention" in Table 2.

Figure 6:
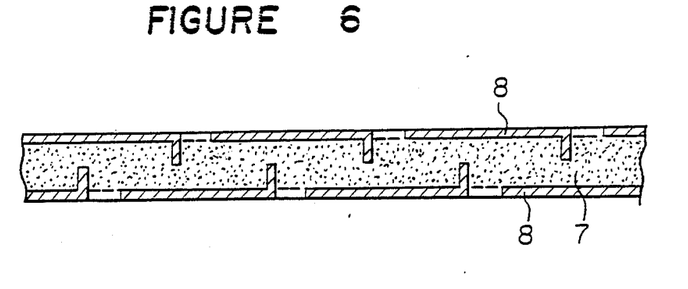
FIG. 6 is a cross-sectional view illustrating the construction of Example 4.
Figure 7:
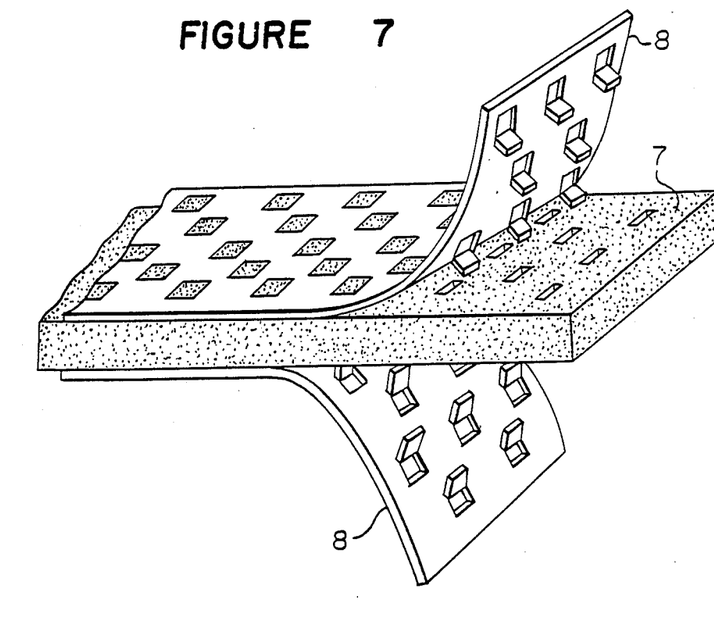
FIG. 7 is a perspective view illustrating the construction of Example 4 wherein jogged steel plates are partially peeled from a gasket material.

FIGS. 6 and 7 illustrate Example 4 of the present invention. These figures show a composite gasket wherein the above-mentioned gasket material 7 is sandwiched by a pair of jagged steel plates 8.

Figure 8:
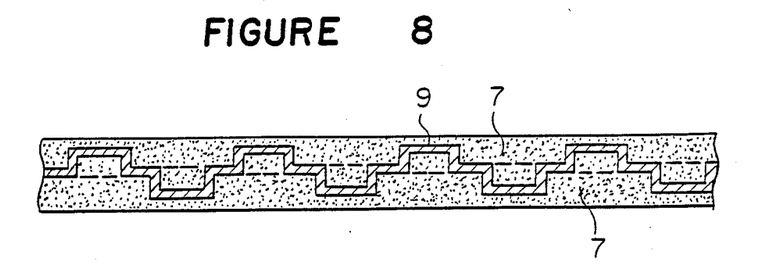
FIG. 8 is a cross-sectional view illustrating the construction of Example 5.
Figure 9:
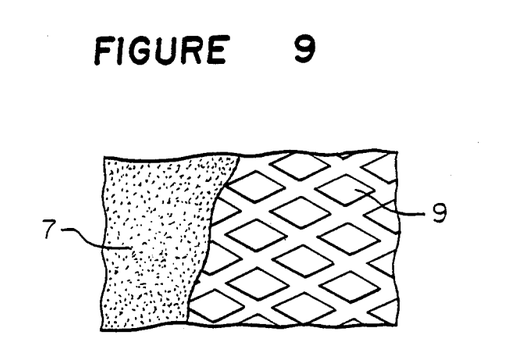
FIG. 9 is a plan view of the construction of Example 5 which is partially broken.

FIGS. 8 and 9 illustrate Example 5 of the present invention, wherein the above-mentioned gasket material 7 is bonded to each side of an embossed aluminum plate 9 machined to have rhombic protrusions and recesses. As the gasket material 7, it is practical to use the one prepared by blending a high proportion of a powdery inorganic filler composed mainly of silicon and magnesium or composed essentially of kaolinite to the PTFE, thoroughly mixing the blend by a dry mixing apparatus, subjecting this powder mixture to a compression molding to obtain a preliminary molded product, sintering the preliminary molded product in an oven at a temperature of at least 350°-C. and paring this sintered material to obtain a thin tape. The thin tape gasket material is then combined with the jagged steel plate or with an embossed aluminum plate as mentioned above, followed by rolling and press bonding by a heat roll or a cold roll to obtain a composite gasket product.

In Table 2, the gasket material 7 of the present invention (a composition obtained by blending 80% by weight of the soft inorganic fine powder to the PTFE) is compared with the conventional asbestos gasket material for various properties.

TABLE 2

| Test method | Product of the present invention (Thickness: 1.2 mm) | Conventional asbestos product (Thickness: 1.2 mm) |
|---|---|---|
| Compressibility (350 kgf/cm$^2$) % | ASTMF 36 | 12–14 | 12–16 |
| Recovery (350 kgf/cm$^2$) % | ASTMF 36 | 20–35 | 40–50 |
| Stress relaxation rate (100° C. × 24 hr) % | ASTMF 38 | 30–40 | 40–55 |
| Oil resistance (weight increase) % | ASTMF 104 | 2–3 | 15–18 |
| Fuel oil resistance (weight increase) % | ASTMF 104 | 0.5–1.5 | 15–18 |
| Water resistance (weight increase) % | ASTMF 104 | 1–3 | 30–40 |
| Sealing properties (antifreezer) (seating stress 50 kgf/cm$^2$) | Test piece 90φ × 70φ | (Leaking pressure) (kg/cm$^2$G) 6–7 | (Leaking pressure) (kg/cm$^2$G) 1–2 |
| (seating stress 100 kgf/cm$^2$) | | 10–12 | 2–3 |

EXAMPLE 6

Figure 10:
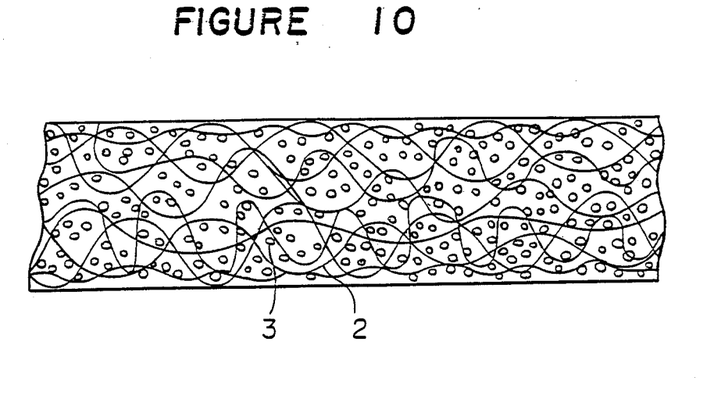
FIG. 10 is a cross-sectional view of the sheet gasket of Example 6.

In the proportions identified in Table 3, a PTFE (CD-1, manufactured by Asahi Fluoropolymer), a fine inorganic powder (kaolinite clay Catalpo having an average particle size of 10 μm, manufactured by Tsuchiya Kaolin Kogyo) and 250 parts by weight of 1,1,1-trichloroethane were mixed, and the mixture was stirred by a mixer for 20 minutes and then subjected to filtration. The filtration product was dried at room temperature. To the dried product, a high viscosity organic solvent (Isoper M, manufactured by Exon Co., Ltd.) was added, and the mixture was stirred by a kneader for 10 minutes and then aged for about 15 hours. This aged product was injected into a mold having an extruding portion of a conical shape with an angle of 40° and an cross-sectional size of the extruding portion of 105 mm and having a ratio of the cross-sectional surface area of the cylinder to the cross-sectional surface area of the nozzle being 15 and extruded at room temperature under a pressure of 40 kgf/cm$^2$ at an extrusion rate of 120 mm/hr to obtain a rod product. This rod product was inserted into a twin roller made of iron having an outer diameter of 200 mm and a length of 400 mm at a compression ratio of 18 at a rate of 1800 mm/hr to obtain an elongated sheet having a width of 300 mm and a thickness of 1 mm. This elongated sheet was dried with hot air at 300° C. and then sintered at 350° C. for 3 hours. The sintered product was inserted into a twin roller made of iron under a surface pressure of 400 kgf/cm$^2$ to obtain a sheet gasket as shown in FIG. 10. The test results obtained by using this sheet gasket are shown in Table 3.

TABLE 3

| | | Example 6 | | | | Conventional product |
|---|---|---|---|---|---|---|
| Composition (parts by weight) | PTFE | 50 | 40 | 20 | 10 | Asbestos joint sheet |
| | Kaolinite clay | 50 | 60 | 80 | 90 | |
| | Test method | | | | | |

TABLE 3-continued

|  |  | Example 6 |  |  |  | Conventional product |
|---|---|---|---|---|---|---|
| Thickness (mm) |  | 1.0 | 1.0 | 1.0 | 1.0 | 1.0 |
| Density (g/cm³) |  | 2.3 | 2.0 | 1.8 | 1.6 | 1.8 |
| Compressibility (%) | ASTMF 36 (350 kgf/cm²) | 3 | 12 | 16 | 23 | 10 |
| Recovery (%) | ASTMF 38 (350 kgf/cm²) | 47 | 23 | 16 | 12 | 49 |
| Stress relaxation rate (%) | ASTMF 38 (100° C. × 24 hr) | 13 | 14 | 14 | 14 | 34 |
| Oil resistance (%) | ASTMF 104 (weight increase) | 2 | 2 | 3 | 3 | 14 |
| Water resistance (%) | ASTMF 104 (weight increase) | 1 | 1 | 2 | 2 | 24 |
| Sealing properties (cm³/10 min) | Air leak detector (seating stress 400 kgf/cm²) (nitrogen gas 10 kgf/cm²) | 3 | 3 | 8 | 10 | 3 |

EXAMPLE 7

Figure 11:
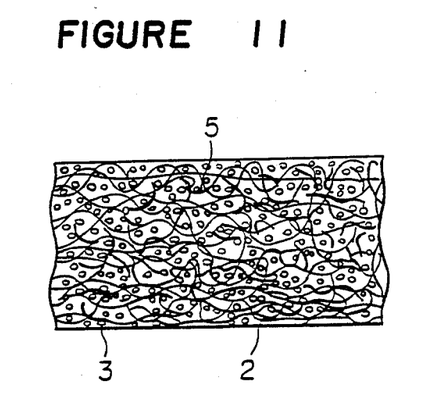
FIGS. 11 to 13 are cross-sectional views of the sheet gaskets of Example 7.
Figure 12:
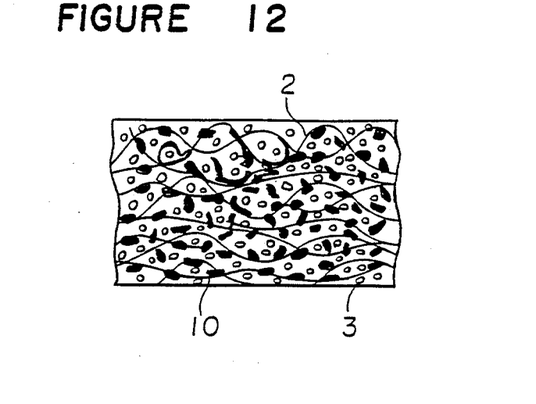
Figure 13:
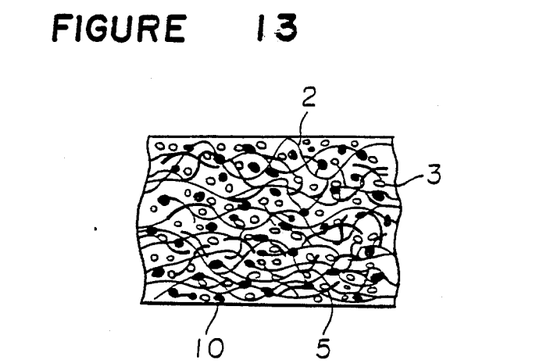

Sheet gaskets as shown in FIGS. 11 to 13 were prepared in the same manner as in Example 6 except that the proportions as identified in Table 3 were changed to the proportions as identified in Table 4. The test results obtained by using these sheet gaskets are shown in Table 4.

In FIGS. 11 to 13, reference numeral 2 indicates PTFE, numeral 3 indicates kaolinite clay, numeral 5 indicates alumina fiber, and numeral 10 indicates PFA.

TABLE 4

|  |  | Example 7 |  |  |
|---|---|---|---|---|
| Composition (parts by weight) | PTFE | 20 | 20 | 20 |
|  | Kaolinite clay | 80 | 80 | 80 |
|  | Alumina fiber | 5 | 0 | 5 |
|  | PFA | 0 | 5 | 5 |
|  | Test method |  |  |  |
| Thickness (mm) |  | 1.0 | 1.0 | 1.0 |
| Density (g/cm³) |  | 1.6 | 1.8 | 1.7 |
| Compressibility (%) | ASTMF 36 (350 kgf/cm²) | 25 | 15 | 20 |
| Recovery (%) | ASTMF 38 (350 kgf/cm²) | 13 | 17 | 14 |
| Stress relaxation rate (%) | ASTMF 38 (100° C. × 24 hr) | 13 | 16 | 14 |
| Oil resistance (%) | ASTMF 104 (weight increase) | 3 | 3 | 3 |
| Water resistance (%) | ASTMF 104 (weight increase) | 2 | 2 | 2 |
| Sealing properties (cm³/10 min) | Air leak detector (seating stress 400 kgf/cm²) (nitrogen gas 10 kgf/cm²) | 15 | 5 | 10 |

In Table 4, the alumina fiber is Fine Flex manufactured by Nichias, PFA is perfluoroalkoxy resin fine powder NP-10, manufactured by Mitsui Dupont Fluoro.

EXAMPLE 8

In the proportions identified in Table 5, a PTFE powder (CD-1, manufactured by Asahi Fluoropolymer), an inorganic filler (kaolinite clay Catalpo having an average particle size of 10 μm, manufactured by Tsuchiya Kaolin Kogyo, and alumina fiber Fine Flex, manufactured by Nichias) and 250 parts by weight of 1,1,1-trichloroethane were mixed and the mixture was stirred by a mixer for 20 minutes and then subjected to filtration. The filtration product was dried at room temperature to obtain a dried mixture. To this mixture, 17 parts by weight of a high visocosity organic solvent (Isoper M, manufactured by Exon Co., Ltd.) was added, and the mixture was stirred by a kneader for 10 minutes and then aged for about 15 hours. This aged product was injected into a mold having an extruding portion of a conical shape with an angle of 40° and a cross-sectional size of the extruding portion of 105 mm and having a ratio of the cross-sectional surface area of the cylinder to the cross-sectional surface area of the nozzle being 15 and extruded at room temperature under a pressure of 40 kgf/cm² at an extrusion rate of 120 mm/hr to obtain a rod product. This rod product was inserted into a twin roller made of iron having an outer diameter of 200 mm and a length of 400 mm at a compression ratio of 18 at a rate of 1800 mm/hr to obtain an elongated sheet having a width of 300 mm and a thickness of 1 mm. This elongated sheet was dried with hot air at 300° C. and then again inserted into a twin roller made of iron to obtain a soft sheet gasket shown in FIG. 14 or 15 composed of a sheet having a smooth surface. The test results obtained by using the sheet gasket are shown in Table 6.

Figure 14:
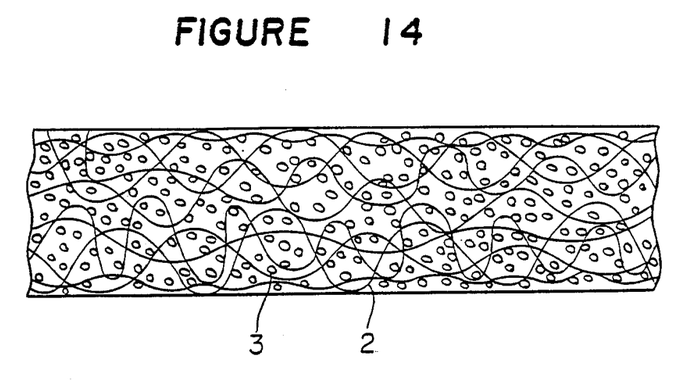
FIG. 14 is a cross-sectional view of the soft sheet gasket No. 1 of Example 8.
Figure 15:
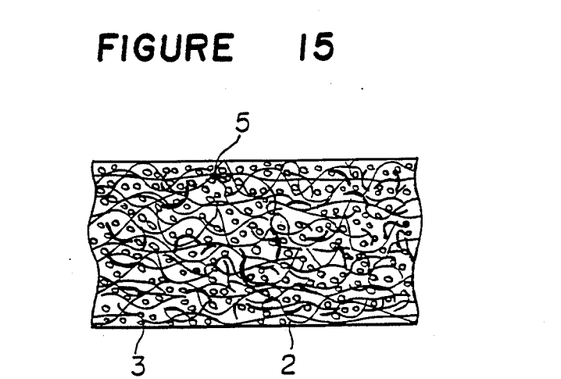
FIG. 15 is a cross-sectional view of the soft sheet gasket No. 5 of Example 8.

In FIGS. 14 and 15, reference numeral 2 indicates PTFE, numeral 3 indicates kaolinite clay, and numeral 5 indicates alumina fiber.

TABLE 5

|  |  |  | Example 8 |  |  |  |  |
|---|---|---|---|---|---|---|---|
|  |  |  | No. 1 | No. 2 | No. 3 | No. 4 | No. 5 |
| Composition (parts by weight) | PTFE |  | 50 | 40 | 20 | 10 | 20 |
|  | Inorganic filler | K* | 50 | 60 | 80 | 90 | 80 |
|  |  | A** | — | — | — | — | 5 |

K* Kaolinite clay
A** Alumina fiber

TABLE 6

|  |  | Example 8 |  |  |  |  |  |
|---|---|---|---|---|---|---|---|
|  | Test method | No. 1 | No. 2 | No. 3 | No. 4 | No. 5 | C* |
| Density (g/cm³) |  | 2.2 | 2.1 | 1.8 | 1.7 | 1.7 | 1.8 |
| Compressibility (%) | ASTMF 36 (350 kgf/cm²) | 5 | 15 | 18 | 25 | 26 | 15 |
| Recovery (%) | ASTMF 38 (350 kgf/cm²) | 50 | 28 | 20 | 15 | 18 | 40 |
| Stress relaxation rate (%) | ASTMF 38 (100° C. × 24 hr) | 12 | 15 | 15 | 15 | 14 | 55 |
| Oil resistance (%) | ASTMF 104 (weight increase) | 4 | 4 | 5 | 5 | 5 | 16 |
| Water resistance (%) | ASTMF 104 (weight increase) | 2 | 2 | 2 | 2 | 2 | 20 |
| Sealing properties (cm³/10 min) | Air leak detector (seating stress 400 kgf/cm²) (nitrogen gas 10 kgf/cm²) | 1 | 1 | 3 | 5 | 1 | 1 |

C* Conventional product:
Soft asbestos joint sheet (asbestos joint sheet containing 15% by weight of rubber)

EXAMPLE 9

Sheet gaskets No. 1 to No. 4 obtained in Example 8 were further subjected to calendering to obtain sheet gaskets having a density of 2.3 g/cm³. The stress relaxation rate (%) (ASTM F38, 100° C., 24 hr) of each sheet gasket was measured. The results are shown in Table 7.

TABLE 7

|  | Example 9 | | | |
|---|---|---|---|---|
|  | No. 1 | No. 2 | No. 3 | No. 4 |
| PTFE (parts by weight) | 50 | 40 | 20 | 10 |
| Kaolinite clay (parts by weight) | 50 | 60 | 80 | 90 |
| Stress relaxation rate (%) | 13 | 10 | 8 | 7 |

EXAMPLE 10

40 Parts by weight of a PTFE powder (CD-1, manufactured by Asahi Fluoropolymer), 60 parts by weight of a fine inorganic powder (kaolinite clay Catalpo, manufactured by Tsuchiya Kaolin Kogyo) and 250 parts by weight of 1,1,1-trichloroethane were mixed, and the mixture was stirred by a mixer for 20 minutes and then subjected to filtration. The filtration product was dried at room temperature. To the dried product, 17 parts by weight of a high viscosity organic solvent (Isoper M, manufactured by Exon Co., Ltd.) was added, and the mixture was stirred by a kneader for 10 minutes and then aged for about 15 hours. The aged product was injected into a mold having an extruding portion of a conical shape with an angle of 40° and a cross-sectional size of the extruding portion of 105 mm and having a ratio of the cross-sectional surface area of the cylinder to the cross-sectional surface area of the nozzle being 15 extruded at room temperature under a pressure of 40 kgf/cm² at an extrusion rate of 120 mm/hr to obtain a rod product. This rod product was inserted into a twin roller made of iron having an outer diameter of 200 mm and a length of 400 mm at a compression ratio of 18 at a rate of 1,800 mm/hr to obtain an elongated sheet having a width of 300 mm and a thickness of 1 mm. The elongated sheet was dried with hot air at 300° C. and then sintered at 350° C. for 3 hours. The sintered sheet was subjected to flatening by a twin roller made of iron under a surface pressure of 300 kgf/cm² to obtain a sheet gasket No. 1 having a porosity of 5% and a pore size of 0.02 μm. This sheet gasket was tested for the compressibility, the recovery, the stress relaxation rate, the water resistance, the oil resistance and the sealing properties. The results are shown in Table 8.

By varing the flatening condition, sheet gaskets No. 2 to No. 6 having the porosities and pore sizes as identified in Table 8 were obtained. These sheets gaskets were tested for the same physical properties as above. The results are shown in Table 8.

TABLE 8

|  | Test method | Example 10 | | | | | | Reference Example 1* |
|---|---|---|---|---|---|---|---|---|
|  |  | No. 1 | No. 2 | No. 3 | No. 4 | No. 5 | No. 6 |  |
| Porosity (%) |  | 5 | 11 | 14 | 27 | 30 | 35 | — |
| Pore size (μm) |  | 0.02 | 0.05 | 0.06 | 0.24 | 0.32 | 0.36 | — |
| Compressibility (%) | ASTM F36 (350 kgf/cm²) | 3 | 12 | 11 | 16 | 19 | 26 | 10 |
| Recovery (%) | ASTM F36 (350 kgf/cm²) | 61 | 26 | 23 | 28 | 23 | 8 | 49 |
| Stress relaxation rate (%) | ASTM F38 (100° C. × 24 hr) | 23 | 30 | 36 | 39 | 44 | 45 | 34 |
| Oil resistance (%) | ASTM F104 (weight increase) | 1 | 1 | 2 | 2 | 3 | 3 | 14 |
| Water resistance (%) | ASTM F104 (weight increase) | 1 | 1 | 1 | 1 | 2 | 2 | 24 |
| Sealing properties (cm³/10 min.) | Air leak detector (seating stress 300 kgf/cm²) (nitrogen gas 10 kgf/cm²G) | 0.01 | 0.3 | 3.3 | 9 | 10 | 15 | 3 |

*Reference Example 1 shows the results of a similar test conducted by using an asbestos joint sheet.

EXAMPLE 11

20 Parts by weight of a PTFE powder (CD-1, manufactured by Asahi Fluoropolymer), 80 parts by weight of a fine inorganic powder (kaolinite clay Catalpo, manufactured by Tsuchiya Kaolin Kogyo) and 250 parts by weight of 1,1,1-trichloroethane were mixed, and the mixture was stirred by a mixer for 20 minutes and then dried at room temperature. To this dried product, 17 parts by weight of a high viscosity organic solvent was added, and the mixture was stirred by a kneader for 10 minutes and then aged for about 15 hours. The aged product was injected into a mold having an extruding portion of a conical shape with an angle of 40° and a cross-sectional size of the extruding portion of 105 mm and having a ratio of the cross-sectional surface area of the cylinder to the cross-sectional surface area of the nozzle being 15 and extruded at room temperature under a pressure of 40 kgf/cm² at an extrusion rate of 120 mm/hr to obtain a rod product. The rod product was inserted into a twin roller made of iron having an outer diameter of 200 mm and a length of 400 mm at a compression ratio of 18 at a rate of 1,800 mm/hr to obtain an elongated sheet having a width of 300 mm and a thickness of 0.65 mm. This elongated sheet was dried with hot air at 300° C. and then sintered at 350° C. for 3 hours. By means of a twin roller made of iron, the sintered sheet was press bonded under a surface pressure of 1,000 kgf/cm² to each side of a jagged steel plate made of SPCC with a thickness of 0.25 mm and provided with perforated hooks with perforations having a diameter of 1.2 mm, to obtain a composite gasket No. 1 having a thickness of 1.2 mm. The sintered body portion of this composite gasket had a porosity of 8% and a pore size of 0.04 μm. This composite gasket was tested for the compressibility, the recovery, the stress relaxation rate, the oil resistance, the water resistance and the sealing properties. The results are shown in Table 9. Similar tests were conducted with respect to composite gaskets No. 2 to No. 4 wherein sheet gasket materials having different porosities and pore sizes were employed. The results are shown in Table 9.

TABLE 9

|  | Test method | Example 11 | | | | Reference Example 2* |
|---|---|---|---|---|---|---|
|  |  | No. 1 | No. 2 | No. 3 | No. 4 |  |
| Porosity (%) |  | 8 | 9 | 10 | 12 | — |
| Pore size (μm) |  | 0.04 | 0.08 | 0.10 | 0.12 | — |
| Compressibility (%) | ASTMF 36 (350 kgf/cm$^2$) | 5 | 6 | 7 | 12 | 13 |
| Recovery (%) | ASTMF 36 (350 kgf/cm$^2$) | 47 | 45 | 41 | 28 | 45 |
| Stress relaxation rate (%) | ASTMF 38 (100° C. × 24 hr) | 8 | 9 | 10 | 11 | 50 |
| Oil resistance (%) | ASTMF 104 (weight increase) | 2 | 2 | 3 | 3 | 16 |
| Water resistance (%) | ASTMF 104 (weight increase) | 1 | 1 | 2 | 2 | 35 |
| Sealing properties (kgf/cm$^2$G) | (Pressure of an antifreezer which can be sealed at a seating stress of 50 kgf/cm$^2$) | 8 | 6 | 3 | 1 | 2 |

*Reference Example 2 shows the results of a similar test conducted by using an asbestos header gasket.

EXAMPLE 12

In the proportions identified in Table 10, A PTFE powder (CD-1, manufactured by Asahi Fluoropolymer), a fine inorganic powder (kaolinite clay Catalpo, manufactured by Tsuchiya Kaolin Kogyo) and 250 parts by weight of 1,1,1-trichloroethane were mixed, and the mixture was stirred by a mixer for 20 minutes and then subjected to filtration. The filtration product was dried at room temperature. To the dried product, 17 parts by weight of a high viscosity organic solvent (Isoper M, manufactured by Exon Co., Ltd) was added, and the mixture was stirred by a kneader for 10 minutes and then aged for about 15 hours. This aged product was injected into a mold having an extruding portion of a conical shape with an angle of 40° and a cross-sectional size of the extruding portion of 105 mm and having a ratio of the cross-sectional surface area of the cylinder to the cross-sectional surface area of the nozzle being 15 and extruded at room temperature under a pressure of 40 kgf/cm$^2$ at an extrusion rate of 120 mm/hr to obtain a rod product. This rod product was inserted into a twin roller made of iron having an outer diameter of 200 mm and a length of 400 mm at a compression ratio of 18 at a rate of 1,800 mm/hr to obtain an elongated sheet having a width of 300 mm and a thickness of 1 mm. This elongated sheet was dried with hot air at 300° C. and then subjected to flattening under a surface pressure of 600 kgf/cm$^2$ by a twin roller made of iron to obtain a sheet gasket No. 1, No. 2 or No. 3. Each sheet gasket was tested for the compressibility, the recovery, the stress relaxation rate, the oil resistance, the water resistance and the sealing properties. The results are shown in Table 10.

TABLE 10

|  |  | Example 12 | | |
|---|---|---|---|---|
|  |  | No. 1 | No. 2 | No. 3 |
| Composition (parts by weight) | PTFE | 50 | 40 | 20 |
|  | Inorganic fine powder | 50 | 60 | 80 |
|  | Test method |  |  |  |
| Porosity (%) |  | 2 | 5 | 15 |
| Pore size (μm) |  | 0.03 | 0.05 | 0.06 |
| Compressibility (%) | ASTM F36 | 3 | 5 | 15 |
| Recovery (%) | ASTM F36 | 60 | 50 | 25 |
| Stress relaxation rate (%) | ASTM F38 | 8 | 11 | 13 |
| Oil resistance (weight increase) | ASTM F104 | 2 | 2 | 3 |
| Water resistance (weight increase) | ASTM F104 | 1 | 1 | 2 |
| Sealing properties (cm$^3$/10 min) | Air leak detector (seating stress 400 kgf/cm$^2$) (nitrogen gas 10 kgf/cm$^2$) | 0.5 | 0.8 | 3 |

The composition of the present invention is excellent in the heat resistance and the chemical resistance and has good moldability. Further, it provides an excellent effect that a molded product prepared from this composition is excellent in the creep resistance and the sealing properties. Further, the composition of the present invention has excellent adhesion to a metal plate or a steel plate, and lamination with such a metal plate can readily be conducted.

In the use of such a composition for a gasket, it exhibits a performance adequate for substitution for an asbestos gasket without a problem such as environmental pollution, and thus it is extremely useful.

Especially when the gasket material having a high proportion of an inexpensive soft fine powdery inorganic filler having excellent heat resistance incorporated to a soft fine PTFE powder having excellent heat resistance, chemical resistance and bonding properties, is combined with a support such as a rugged metal plate, a meshed metal plate or a metal net, the composite gasket thus obtained has a high heat resistance and is useful even at high temperatures. It can be used continuously for a long period of time since it is free from thermal degradation, curing or seizing, whereby the running costs including a maintenance cost, a cost for using a antiseize agent and a cost for the gasket can be substantially reduced. Besides, in the case of a gasket wherein the fine inorganic powder is incorporated in a high proportion, the cost for the gasket material can be substantially reduced, and at the same time, flexibility required for a gasket is thereby obtainable. Furthermore, since the fine inorganic powder is firmly held in the PTFE filbrils, the gasket of the present invention has high strength and excellent handling efficiency, and it provides excellent sealing effect.

Further, since the gasket contains no asbestos, it is free from environmental pollution. In addition to the chemical resistance of the fine inorganic powder, the strong chemical resistance of the PTFE is added, whereby the gasket of the present invention is useful for sealing various kinds of chemical fluids. The gasket of the present invention can be prepared by a highly productive process for the production of an elongated gasket, which further contributes to a reduction of cost in addition to the above-mentioned reduction of cost attributable to the construction and the manner of application, whereby the gasket can be made useful for general purpose from the aspect of the cost.

In the use of the present invention, the sintered sheet gasket wherein the PTFE is sintered, has high heat resistance and thus is useful at high temperatures. Further, since it is free from thermal degradation, curing or seizing, it can be used continuously for a long period of time, whereby the cost for mending can be substantially reduced, and use of a antiseize agent can be omitted. Still further, since the gasket of the present invention does not contain asbestos, there is no problem of environmental pollution. Furthermore, the sheet gasket of the present invention has excellent flexibility and high strength and thus has excellent handling efficiency. In addition, it has excellent water resistance and oil resistance and exhibits excellent effects as a sealing material for various liquids.

In the use of the present invention, the soft sheet gasket wherein the PTFE is not sintered has excellent heat resistance and is useful at high temperatures. Further, it is free from thermal degradation, curing or seizing, and it can be used continuously for a long period of time, whereby the cost for mending can be substantially reduced, and use of a antiseize agent is unnecessary. This soft sheet gasket has excellent flexibility and thus provides excellent sealing effect even under a low seating stress. Namely, it is applicable even to an object such as a glass lining where no high seating stress can be applied. Such a soft sheet gasket contains no asbestos and thus is free from a problem of environmental pollution. Further, it has excellent oil resistance and water resistance and thus exhibits excellent effects as a sealing material for various chemical fluids.

Particularly when it is formed into a sheet gasket having a specific porosity and pore size, it is possible to improve the sealing properties by minimizing the stress relaxation rate.

We claim:

1. A gasket, comprising a sheet of a composition consisting essentially of a fibrillated polytetrafluoroethylene resin and a fine inorganic powder having an average particle size of not larger than 100 $\mu$m and containing at least 30% by weight of a clay mineral, based on the total weight of the fine inorganic powder, said composition characterized in that the polytetrafluoroethylene resin is at least 5% by weight and the fine inorganic powder is at least 40% by weight, based on the total amount of the polytetrafluoroethylene resin and the fine inorganic powder, the polytetrafluoroethylene resin and the fine inorganic powder are mutually uniformly dispersed and mixed with each other, and further comprising a metal support for said sheet.

2. The gasket according to claim 1, wherein the clay mineral is a kaolin clay mineral.

3. The gasket according to claim 2, wherein the kaolin clay mineral is kaolinite, halloysite or hydrated halloysite.

4. The gasket according to claim 1, wherein the metal support is selected from the group consisting of a rugged metal plate, a meshed metal plate and a metal net.

5. The gasket according to claim 1, wherein the gasket is a gasket for an automobile engine head.

* * * * *